United States Patent [19]

Grootaert

[11] Patent Number: 5,285,002
[45] Date of Patent: Feb. 8, 1994

[54] FLUORINE-CONTAINING POLYMERS AND PREPARATION AND USE THEREOF

[75] Inventor: Werner M. Grootaert, Oakdale, Minn.

[73] Assignee: Minnesota Mining and Manufacturing Company, St. Paul, Minn.

[21] Appl. No.: 36,073

[22] Filed: Mar. 23, 1993

[51] Int. Cl.[5] .............................................. C08F 2/00
[52] U.S. Cl. .................................... 526/222; 526/225; 526/247; 526/249; 526/254; 526/255
[58] Field of Search .............. 526/225, 222, 247, 249, 526/254, 255

[56] References Cited

U.S. PATENT DOCUMENTS

| | | | |
|---|---|---|---|
| 2,567,803 | 9/1951 | Castan et al. | 526/222 |
| 2,768,156 | 10/1956 | Bredereck et al. | 526/225 |
| 2,862,946 | 12/1958 | Kharasch | 526/222 |
| 3,083,220 | 3/1963 | Edens | 526/225 |
| 3,337,518 | 8/1967 | Serniuk et al. | 526/222 |
| 3,492,259 | 1/1970 | Wolinski | 526/222 |
| 3,842,019 | 10/1974 | Kropp | 526/225 |
| 4,025,709 | 5/1977 | Blaise et al. | 526/225 |
| 4,035,565 | 7/1977 | Apotheker et al. | |
| 4,233,421 | 11/1980 | Worm | |
| 4,287,320 | 9/1981 | Kolb | |
| 4,381,384 | 4/1983 | Khan | 526/206 |
| 4,450,263 | 5/1984 | West | |
| 4,514,197 | 6/1985 | Khan | |
| 4,558,141 | 12/1985 | Squire | |
| 4,564,662 | 1/1986 | Albin | |
| 4,626,587 | 12/1986 | Morgan et al. | |
| 4,654,444 | 3/1987 | Oka et al. | |
| 4,663,407 | 5/1987 | Oka et al. | |
| 4,743,658 | 5/1988 | Imbalzano et al. | |
| 4,882,390 | 11/1989 | Grootaert et al. | |
| 5,086,123 | 2/1992 | Guenthner et al. | |

FOREIGN PATENT DOCUMENTS

| | | |
|---|---|---|
| 2056692 | 6/1992 | Canada . |
| 0072659 | 2/1983 | European Pat. Off. ............ 526/225 |
| 91107750.1 | 5/1992 | European Pat. Off. . |
| 1110868 | 7/1961 | Fed. Rep. of Germany ...... 526/225 |
| 1174989 | 7/1964 | Fed. Rep. of Germany ...... 526/225 |
| 42-16066 | 9/1967 | Japan ................................... 526/225 |
| 836741 | 6/1960 | United Kingdom ................ 526/225 |
| 1067068 | 5/1967 | United Kingdom ................ 526/225 |

OTHER PUBLICATIONS

F. W. Billmeyer, *Textbook of Polymer Science*, 3rd ed., pp. 398-403, John Wiley & Sons, New York (1984).
Brullo, R. A., "Fluoroelastomer Rubber for Automotive Applications,"*Automotive Elastomer & Design*, Jun. 1985.
"Fluoroelastomer Seal Up Automotive Future," *Materials Engineeering*, Oct. 1988.
"Fluorinated Elastomers," Kirk-Othmer, *Encyclopedia of Chemical Technology*, vol. 8, pp. 500-515 (3rd ed., John Wiley & Sons, 1979).
"Organic Fluorine Compounds," Kirk-Othmer, *Encyclopedia of Chemical Technology*, vol. 11, pp. 20, 21, 32, 33, 40, 41, 48, 50, 62, 70, 71, John Wiley & Sons, (1980).
Chang-Ming Hu, Feng-Ling Quing, and Wei-Yuan Huange, *J. Org. Chem.*, 1991, 56, 2801-2804.

*Primary Examiner*—Joseph L. Schofer
*Assistant Examiner*—N. Sarofin
*Attorney, Agent, or Firm*—Gary L. Griswold; Walter N. Kirn; Robert H. Brink

[57] ABSTRACT

Fluoroalkyl sulfinates were synthesized and used as a source of fluoroalkyl radicals in aqueous emulsion polymerization. The resulting polymers contained a high level of perfluoroalkyl end groups. When fluoroalkyl disulfinates were utilized, the fluoroalkyl moiety and was incorporated in the polymer backbone. These disulfinates act as monomers, yielding fluoropolymers with specific micro structural fragments, derived from the parent perfluoro disulfinate. Novel fluoropolymers can thus be prepared.

7 Claims, No Drawings

FLUORINE-CONTAINING POLYMERS AND PREPARATION AND USE THEREOF

This invention relates to fluorine-containing polymers, their preparation and use. In another aspect, this invention relates to methods of free-radical polymerization of ethylenically unsaturated monomers, and to the resulting polymers and shaped articles thereof.

Fluorine-containing polymers, or fluoropolymers, are an important class of polymers and include for example, fluoroelastomers and fluoroplastics. Within this class are polymers of high thermal stability and usefulness at high temperatures, and extreme toughness and flexibility at very low temperatures. Many of these polymers are almost totally insoluble in a wide variety of organic solvents, and are chemically inert. Some have extremely low dielectric loss and high dielectric-strength, and most have unique nonadhesive and low-friction properties. See, for example, F. W. Billmeyer, *Textbook of Polymer Science*, 3rd ed., pp 398–403, John Wiley & Sons, New York (1984).

Fluoroelastomers, particularly the copolymers of vinylidene fluoride with other ethylenically unsaturated halogenated monomers, such as hexafluoropropene, have particular utility in high temperature applications, such as seals, gaskets, and linings—see, for example, Brullo, R. A., "Fluoroelastomer Rubber for Automotive Applications," *Automotive Elastomer & Design*, June 1985, "Fluoroelastomer Seal Up Automotive Future," *Materials Engineering*, October 1988, and "Fluorinated Elastomers," Kirk-Othmer, *Encyclopedia of Chemical Technology*, Vol. 8, pp. 500–515 (3rd ed., John Wiley & Sons, 1979). Fluoroplastics, particularly polychlorotrifluoroethylene, polytetrafluoroethylene, copolymers of tetrafluoroethylene and hexafluoropropylene, and poly(vinylidene fluoride), have numerous electrical, mechanical, and chemical applications. Fluoroplastics are useful, for example, in wire, electrical components, seals, solid and lined pipes, and pyroelectric detectors. Polychlorotrifluoroethylene is compatible with liquid oxygen, and remains tough at cryogenic temperatures. See, for example, "Organic Fluorine Compounds," Kirk-Othmer, *Encyclopedia of Chemical Technology*, Vol. 11, pp.20, 21, 32, 33, 40, 41, 48, 50, 52, 62, 70, 71, John Wiley & Sons, (1980).

Fluorine-containing polymers can be prepared by free-radical initiated polymerization of one or more fluorine-containing ethylenically unsaturated monomers. Free radicals are typically formed by the decomposition of a free-radical initiator. Free-radical initiators may be decomposed by light, heat, high energy radiation, or as a result of oxidation-reduction reactions. When free radicals are generated in the presence of free-radical polymerizable ethylenically unsaturated monomers, a chain reaction occurs producing polymer. The polymer can be prepared by polymerization of monomers in bulk, in solution, in emulsion, or in suspension. Fluoroelastomers and fluoroplastics are preferably prepared by aqueous emulsion or suspension polymerization because of the rapid and nearly complete conversion of monomers, easy removal of the heat of polymerization and ready isolation of the polymer. Emulsion or suspension polymerization typically involves polymerizing monomers in an aqueous medium in the presence of an inorganic free-radical initiator system, and surfactant or suspending agent.

Polymers of low molecular weight can be prepared by polymerizing monomers in the presence of a chain-transfer agent. Chain-transfer agents react with the growing polymer chain. In this reaction, the growing polymer chain is terminated and the chain-transfer agent is converted into a radical. This newly-formed free-radical typically can react immediately with monomer, thereby initiating the polymerization of a new polymer chain. Examples of conventional chain-transfer agents are carbon tetrachloride, acetone, diethyl malonate, and dodecylmercaptan. Chain-transfer activity varies greatly with changes in solvents and monomers.

In aqueous emulsion or suspension polymerization of fluorine-containing ethylenically unsaturated monomer, conventional chain-transfer agents generally can terminate a growing polymer chain but generally do not immediately react with monomer to initiate a new polymerization. As a result, the polymerization generally is slow and most polymer chains contain an ionic end-group due to initiation by ionic radical-initiator, e.g., sulfate radical ion.

Ionic or polar end-groups generally are not desirable because of detrimental affects on rheology. U.S. Pat. No. 4,524,197 (Khan) states that the presence of acid end-groups detrimentally effects the processing characteristics of fluoroelastomers since these groups increase the viscosity of the polymer and interfere with curing systems, especially those based on quaternary phosphonium salts.

Ionic or polar end-groups may also reduce the thermal stability of certain fluorine-containing polymers. U.S. Pat. No. 4,743,658 (Imbalzano et al.) states that perfluorinated resins with certain end groups, especially —COF, —CONH$_2$, and —CF$_2$CH$_2$OH, can be chemically reactive and thermally unstable. Such end groups can evolve HF, which is generated by the oxidation, hydrolysis, and/or thermal decomposition of these end groups.

Polymers with non-ionic end groups can be prepared by the use of non-ionic free-radical initiators, e.g., azobisisobutyronitrile or benzoyl peroxide. However, most non-ionic free-radical initiators are generally insoluble in water and are therefore not suitable for aqueous emulsion or suspension polymerization. The employment of water-insoluble initiators would require the use of organic co-solvents and/or seed latices produced with water-soluble initiators.

Chang-Ming Hu, Feng-Ling Quing, and Wei-Yuan Huang, *J. Org. Chem.*, 1991, 56, 2801–2804, reported that perfluoroalkyl sulfinates dissolved in an organic solvent such as dimethyl formamide, react smoothly with allyl and propargyl halides in the presence of an oxidant, to yield 3-(perfluoroalkyl) prop-1-enes or allenes, respectively, in very good yields. The mechanism of this reaction is believed to be a free radical addition-elimination reaction.

Because sulfinates are well known electron donors, a suitable electron acceptor (oxidant) should initiate electron transfer from R$_f$SO$_2$Na to generate R$_f$SO$_2$· radicals and, subsequently, R$_f$· radicals. See, for example, Chang-Ming Hu, et al., supra. The oxidants described in Hu's paper, were O$_2$, Ce(SO$_4$)$_2$, and ammonium persulfate. Ammonium persulfate was said to be the preferred reagent with dimethyl formamide (DMF) as the solvent.

Although it is widely recognized that fluoropolymers with perfluorinated end groups are more thermally stable and show rheological advantages over fluoropolymers with ionic end groups, the only described ways to get these perfluorinated end groups is by use of fluorinated peroxides as initiators, see e.g., U.S. Pat. Nos. 4,654,444 and 4,663,407 (Oka et al.) or by direct fluorination processes on the final polymer, see e.g., European patent application EP 91107750.1, Ihara, et al. and references cited therein.

However, perfluoroperoxides are extremely unstable substances and need to be handled in dilute solutions in halogenated solvents such as Freon TM 113 at low temperature. Besides the fact that the handling of these substances poses a significant hazard, they also require the use of organic cosolvents (typically Freon TM 113) during the polymerization. The use of Freon TM 113 is undesirable because of possible ozone depletion. Also, because of the thermal instability of these perfluoroperoxides, the polymerization should be carried out below room temperature. This imposes the expense of cooling equipment.

Direct fluorination of the final polymer, to obtain perfluorinated end groups, is a cumbersome process requiring highly reactive fluorine gas to be contacted with finely powdered fluoropolymer at elevated temperatures for several hours. In addition, unless the backbone is perfluorinated, direct fluorination may also fluorinate the backbone which may be undersirable. The degree of fluorination is highly dependant on the polymer particle size, the temperature, the fluorine content of the fluorination gas, and the contact time. These parameters are difficult to control reproducibly. Therefore, it is difficult to obtain a uniform degree of fluorination, especially in a factory environment.

Briefly, in one aspect, the present invention provides a method for the preparation of fluorine-containing polymer comprising polymerizing, under free-radical conditions, an aqueous emulsion or suspension of a polymerizable mixture comprising a fluoroaliphatic-radical containing sulfinate, and an oxidizing agent capable of oxidizing said sulfinate to a sulfonyl radical. Preferably, said oxidizing agent is water soluble. Preferably, said polymerizable mixture comprises fluorine-containing ethylenically-unsaturated monomers.

In another aspect, this invention provides a fluorine-containing polymer comprising a fluoroaliphatic group, e.g., fluoroalkyl or fluoroalkylene group, derived from a fluoroaliphatic-radical containing sulfinate. The polymer backbone chain can contain heteroatoms, e.g., nitrogen atoms.

The polymerization method of this invention can be used to rapidly prepare fluorine-containing polymers that are easy to process. Preferred oxidizing agents are persulfates, e.g., ammonium persulfate. High yields of fluorine-containing polymer with perfluorinated end groups were obtained when fluoroaliphatic-radical containing sulfinates were used in combination with ammonium persulfate.

The sulfinates are stable salts that can be stored for several months at room temperature without any appreciable loss of activity. Because sulfinates and persulfates are very soluble in water, they readily react with each other in the aqueous phase of the emulsion or suspension. The resulting perfluoroalkyl radical that is formed from this reaction is hydrophobic and therefore readily collapses or absorbs onto the micelle or the polymer particles, inducing a rapid polymerization.

The majority of the polymer end-groups formed by the method of this invention are fluoroaliphatic, e.g. $C_nF_{2n+1}$ and, when hydrogen-containing monomers are used, hydride, e.g. $CF_2H$ and $CH_3$. Very small amounts of $CH_2OH$ (if any) end groups are detected in the final polymer. As used herein, "end-group" refers to groups at the end of the polymer chain or at the end of long or short branches.

A class of the fluoroaliphatic sulfinates useful in this invention can be represented by the following general formulae

or

wherein $R_f$ represents a monovalent fluoroaliphatic radical having, for example, from 1 to 20 carbon atoms, preferably 4 to 10 carbon atoms, $R_f'$ represents a polyvalent, preferably divalent, fluoroaliphatic radical having, for example, from 1 to 20 carbon atoms, preferably from 2 to 10 carbon at oms, M represents a hydrogen atom or cation with valence x, which is 1 to 2, and is preferably 1, n is 1 to 4, preferably 1 or 2.

The monovalent fluoroaliphatic radical, $R_f$, is a fluorinated, stable, inert, non-polar, saturated moiety. It can be straight chain, branched chain, and, if sufficiently large, cyclic, or combinations thereof, such as alkyl cycloaliphatic radicals. Generally, $R_f$ will have 1 to 20 carbon atoms, preferably 4 to 10, and will contain 40 to 83 weight percent, preferably 50 to 78 weight percent fluorine. The preferred compounds are those in which the Rf group is fully or substantially completely fluorinated, as in the case where $R_f$ is perfluoroalkyl, $C_nF_{2n+1}$, where n is 1 to 20.

The polyvalent, preferably divalent, fluoroaliphatic radical, $R_f'$ is a fluorinated, stable, inert, non-polar, saturated moiety. It can be straight chain, branched chain, and, if sufficiently large, cyclic or combinations thereof, such as alkylcycloaliphatic diradicals. Generally, $R_f'$, will have 1 to 20 carbon atoms, preferably 2 to 10. The preferred compounds are those in which the $R_f'$ group is perfluoroalkylene, $C_nF_{2n}$, where n is 1 to 20, or perfluorocycloalkyl, $C_nF_{2n}$, where n is 5 to 20.

With respect to either $R_f$ or $R_f'$, the skeletal chain of carbon atoms can be interrupted by divalent oxygen, hexavalent sulfur or trivalent nitrogen hetero atoms, each of which is bonded only to carbon atoms, but preferably where such hetero atoms are present, such skeletal chain does not contain more than one said hetero atom for every two carbon atoms. An occasional carbon-bonded hydrogen atom, iodine, bromine, or chlorine atom may be present; where present, however, they preferably are present not more than one for every two carbon atoms in the chain. Where $R_f$ or $R_f'$ is or contains a cyclic structure, such structure preferably has 6 ring member atoms, 1 or 2 of which can be said hetero atoms, e.g., oxygen and/or nitrogen. Examples of $R_f$ radicals are fluorinated alkyl, e.g., $C_4F_9$—, $C_6F_{13}$—, $C_8F_{17}$—, alkoxyalkyl, e.g., $C_3F_7OCF_2$—. Examples of $R_f'$ are fluorinated alkylene, e.g., —$C_4F_8$—, —$C_8F_{16}$—. Where $R_f$ is designated as a specific radical, e.g., $C_8F_{17}$—, it should be understood that this radical can represent an average structure of a mixture, e.g., $C_6F_{13}$— to $C_{10}F_{21}$—, which mixture can also include branched structures.

Representative fluoroaliphatic sulfinate compounds useful in the practice of this invention include the following:

$CF_3SO_2Na$
$C_4F_9SO_2H$
$C_8F_{17}SO_2Na$
$CF_3C(Cl)_2CF_2SO_2K$
$Cl(CF_2)_8OC_2F_4SO_2Na$
$Cl(CF_2)_xCF_2SO_2Na$, where x is 0,1,3,4,7,9
$NaO_2SC_8F_{16}SO_2Na$
$NaO_2SC_6F_{12}SO_2Na$
$NaO_2SC_2F_4OC_2F_4SO_2Na$
$NaO_2SC_2F_4OC_2F_4X$, where X is Br or I
$NaO_2S[C_4F_8O]_nC_3F_6SO_2Na$
$NaO_2SCF_2O(CF_2CF_2O)_m(CF_2O)_nCF_2SO_2Na$
$(CF_3)_2NCF_2CF_2SO_2Na$
$(C_2F_5)_2NCF_2CF_2SO_2Na$
$N(C_2F_4SO_2Na)_3$
$NaO_2SC_8F_{16}SO_2F$

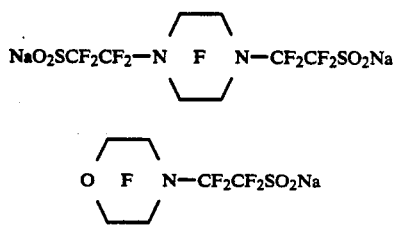

$NaO_2SC_3F_6O(C_4F_8O)_nC_3F_6SO_2Na$ where n is 4 to 8.

Suitable fluorine-containing ethylenically-unsaturated monomers for use in the method of this invention include the terminally unsaturated monoolefins typically used for the preparation of fluorine-containing polymers such as vinylidene fluoride, hexafluoropropene, chlorotrifluoroethylene, 2-chloropentafluoropropene, perfluoroalkyl vinyl ethers, e.g., $CF_3OCF=CF_2$ or $CF_3CF_2OCF=CF_2$, tetrafluoroethylene, 1-hydropentafluoropropene, 2-hydropentafluoropropene, dichlorodifluoroethylene, trifluoroethylene, 1,1-dichlorofluoroethylene, vinyl fluoride, and mixtures thereof. Perfluoro-1,3-dioxoles such as

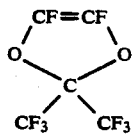

may also be used. The perfluoro-1,3-dioxole monomers and their copolymers are described, for example, in U.S. Pat. No. 4,558,141 (Squire). Certain fluorine-containing di-olefins are also useful, such as, perfluorodiallylether and perfluoro-1,3-butadiene. Said fluorine-containing monomer, or fluoromonomer, may also be copolymerized with fluorine-free terminally unsaturated monoolefin comonomers, e.g., ethylene or propylene. Preferably at least 5% by weight, most preferably at least 50%, of all monomers in said polymerizable mixture are fluorine-containing. Said fluorine-containing monomer may also be copolymerized with iodine- or bromine-containing cure-site comonomers in order to prepare peroxide curable polymers, e.g., fluoroelastomers. Suitable cure-site monomers include terminally unsaturated monoolefins of 2 to 4 carbon atoms such as bromodifluoroethylene, bromotrifluoroethylene, iodotrifluoroethylene, and 4-bromo-3,3,4,4-tetrafluorobutene-1. Preferably, all or essentially all of the comonomers in said polymerizable mixture are ethylenically unsaturated monomers.

The method of this invention can comprise the use of perfluorosulfinate in otherwise conventional free-radical polymerization. Such conventional polymerization includes free-radical polymerization of monomers alone or as solutions, emulsions, or dispersions in an organic solvent or water. Polymerization in an aqueous emulsion or suspension is often preferred because of the rapid and nearly complete conversion of monomers, easy removal of the heat of polymerization, and ready isolation of the polymer. Emulsion or suspension polymerization typically involves polymerizing monomers in an aqueous medium in the presence of an inorganic free-radical initiator system and surfactant or suspending agent.

In one aspect, the method of this invention comprises the use of fluorinated sulfinate as a reducing agent and a water soluble oxidizing agent capable of converting the sulfinate to a sulfonyl radical. Preferred oxidizing agents are sodium, potassium, and ammonium persulfates, perphosphates, perborates, and percarbonates. Particularly preferred oxidizing agents are sodium, potassium, and ammonium persulfates. The sulfonyl radical so produced is believed to eliminate $SO_2$, forming a fluorinated radical that initiates the polymerization of the ethylenically unsaturated monomers.

In addition to the sulfinate, other reducing agents can be present, such as sodium, potassium or ammonium sulfites, bisulfite, metabisulfite, hyposulfite, thiosulfite, phosphite, sodium or potassium formaldehyde sulfoxylate or hypophosphite. Activators such as ferrous, cuprous, and silver salts, may also be present.

Aqueous emulsions can be carried out under conventional steady-state conditions in which, for example, monomers, water, surfactants, buffers and catalysts are fed continuously to a stirred reactor under optimum pressure and temperature conditions while the resulting emulsion or suspension is removed continuously. An alternative technique is batch or semibatch polymerization by feeding the ingredients into a stirred reactor and allowing them to react at a set temperature for a specified length of time or by charging ingredients into the reactor and feeding the monomer into the reactor to maintain a constant pressure until a desired amount of polymer is formed.

The amount of fluoroaliphatic sulfinate used can vary, depending, for example, on the molecular weight of polymer desired. Preferably the amount of fluoroaliphatic sulfinate is from 0.01 to 50 mole %, and most preferably from 0.05 to 10 mole %, of sulfinate compound based on total quantity of monomers.

Combinations of monosulfinates, disulfinates, and trisulfinates can be used, depending on whether it is desired to use sulfinate as an initiator, a monomer, or both. When polyvalent sulfinates, such as those represented by Formula II, are used, the sulfinate is a monomer and the fluorinated moiety is incorporated into the polymer backbone. When monosulfinates are used the fluorinated moiety is incorporated as a polymer end group.

Polymers prepared by the method of this invention, such as fluoroelastomer gums, can be compounded and cured using conventional methods. Such polymers are often cured by nucleophiles such as diamines or polyhydroxy compounds. For example, the fluoroelastomers of this invention may be crosslinked with aromatic polyhydroxy compounds, such as bisphenols, which are compounded with the polymer along with a curing accelerator, such as a quaternary phosphonium salt, and acid acceptors, such as magnesium oxide and calcium hydroxide. Particularly useful polyhydroxy compounds include 4,4'-thiodiphenol, isopropylidene-bis(4-hydroxybenzene), and hexafluoroisopropylidene-bis(4-hydroxybenzene) ("bisphenol AF") which are described, for example, in U.S. Pat. No. 4,233,421 (Worm). Such crosslinking methods are described, for example, in U.S. Pat. Nos. 4,287,320 (Kolb), 4,882,390 (Grootaert et al.), 5,086,123 (Guenthner et al.), and Canadian patent 2056692 (Kruger et al.).

Certain polymers may be cured with peroxides. A cure-site monomer susceptible to free-radical attack is generally required to render polymers peroxide-curable. For example, polymers which contain interpolymerized units derived from iodine- or bromine-containing monomers are often peroxide-curable. Such cure-site monomers are described, for example, in U.S. Pat. Nos. 4,035,565 (Apotheker et al.), 4,450,263 (West), 4,564,662 (Albin), and Canadian Pat. application No. 2,056,692 (Kruger et al.)

The polymers of this invention can also be compounded with processing agents, such as those conventionally used to aid in the molding or extrusion of the formulation, e.g. carnauba wax or dichlorodiphenyl sulfones and other diorgano sulfur oxides, such as those described in U.S. Pat. No. 4,287,320 (Kolb).

Fillers can be mixed with the polymers of this invention to improve molding characteristics and other properties. When a filler is employed, it can be added in amounts of up to about 100 parts per hundred parts by weight of polymer, preferably between about 15 to 50 parts per hundred parts by weight of the polymer. Examples of fillers which may be used are thermal-grade carbon blacks, or fillers of relatively low reinforcement characteristics such as clays and barytes.

The sulfinate compounds useful in this invention result in polymers which have non-polar, non-ionic end groups. These non-ionic end groups generally result in improved properties such as improved thermal stability and improved rheological behavior. Polymers with non-ionic end groups exhibit lower apparent viscosities during processing, e.g. injection molding, when compared at the same shear rates to polymers with ionic end groups. The resulting polymers may be elastomers or plastics. The polymers may be shaped to form useful articles including 0-rings, fuel-line hoses, shaft seals, and wire insulation.

When disulfinates are used in the polymerization method of this invention, diradicals are formed that are incorporated in the polymer backbone. This method can be used to prepare a variety of new polymers with new microstructures which would otherwise be inaccessible.

The polymers of this invention can be mixed with other polymers, for example, with polymers of higher or lower molecular weight to give a bimodal molecular-weight mixture. For example, low molecular-weight polymers of this invention can be mixed with conventional fluorine-containing polymers to improve the processing characteristics thereof.

EXAMPLES

The cure characteristics and rheological properties of uncured compositions were obtained using ASTM test method D 2084-75 with no preheat, an oscillator frequency of 100 cpm and a 3° arc, at 177° C. Minimum torque ($M_L$), highest torque attained during a specified period of time when no plateau or maximum torque is obtained $M_H$), time for torque to increase 0.2 N.m above $M_L$ ($t_s2$), and time for torque to reach $M_L=0.9$ $M_H-0.9$ $M_L$ ($tc'(90)$)) were determined. The results are shown in Table 2.

Compounded polymer compositions were press-cured for 10 min. at 177° C. and post-cured for 16 hours at 230° C. and physical properties determined. Tensile strength at break, elongation at break, and modulus at 100% elongation were obtained using ASTM Method D-412-80 on a sample cut from 1.8 mm sheet of cured polymer with ASTM Die D. Hardness (Shore A-2) was measured at room temperature on cured samples according to ASTM Method D-2240-81 using Shore Instrument and Mfg. Co. "A-2" hardness measuring device. Compression set was determined using ASTM Method D-395-78, Method B, on cured (10 min. press cure at 177° C. followed by 16 hours postcure at 230° C.) O-rings after 25% compression for 70 hours at 200° C. Compression set results are reported as percent of the compression remaining.

The following Examples describe the preparation of perfluoroalkyl sulfinates and their use as free radical initiators in the polymerization of fluorine-containing monomers to prepare fluoropolymers of the invention containing perfluoroalkyl end groups or perfluoroalkyl-ene chain segments.

Preparation of Sulfinates

The fluorochemical sulfinates $C_8F_{17}SO_2Na$ and $(CF_2)_6(SO_2Na)_2$ ("FS-1" and "FS-2") were prepared by deiodosulfination of the corresponding iodides ($C_8F_{17}I$ and $I(CF_2)_6I$) with $Na_2S_2O_4$ following the general procedure of Hu et al. in *J. Org. Chem.*, Vol. 56, No. 8, 1991, page 2803.

The fluorochemical sulfinate $C_4F_9SO_2H$ ("FS-3") was prepared by reduction of the corresponding sulfonyl fluoride $C_4F_9SO_2F$ with $Na_2SO_3$. The purity of these fluorochemical sulfinates, as determined by $^{19}F$ NMR anylysis, was about 90%. (About 9% of $HCF_2C_7F_{14}SO_2Na$ was present in FS-1.)

Fluorochemical sulfinate N,N-bis (2-sulfinotetra-fluoroethyl)perfluoropiperazine ("FS-4"), was prepared by reduction of N,N'-bis[2-(fluorosulfonyl)ethyl]-piperazine, m.p. 73° C., with $NaBH_4$ in tetrahydrofuran (THF) solution. The solid reaction product, obtained on evaporation of the THF, was dissolved in 10% aqueous sulfuric acid and the sulfinic acid product, FS-4, was recovered by eXtraction with diethyl ether. $^{19}F$ NMR analysis of the sulfinic acid, m.p. 115° C. dec., indicated 97% purity. The N,N'- bis[2-(fluorosulfonyl)ethyl]piperazine was prepared by the addition of 2 moles of vinylsulfonylfluoride to piperazine followed by electrochemical fluorination of the resulting adduct.

Preparation of Polymers

Several fluoropolymers were prepared using the above fluorochemical mono- and disulfinates. Aqueous emulsion polymerization utilizing these sulfinates were carried out with the following monomers: vinylidine fluoride (VF$_2$, $CH_2=CF_2$), hexafluoropropylene (HFP, $CF_3CF=CF_2$), tetrafluoroethylene (TFE, $CF_2=CF_2$), bromodifluoroethylene cure site monomer (BDFE, $CF_2=CHBr$), and chlorotrifluoroethylene (CTFE).

EXAMPLE 1

A 4-L stainless steel high pressure reactor was charged with 2.8 L of deionized water, 12 g of $K_2HPO_4$, 4 g of $(NH_4)_2S_2O_8$ and 9 g of FS-1 ($C_8F_{17}SO_2Na$). The reactor was evacuated (vacuum pump) and then pressurized with nitrogen to 0.17 MPa (25 psig). This evacuation and pressurization was repeated four consecutive times. The reactor and contents were then heated to 71° C. and pressurized to 0.90 MPa (130 psig) with a mixture of VF2(61.7 weight %) and HFP (38.3 weight %). The reactor contents were agitated (650 rpm) and pressure maintained at 0.90 MPa with the monomer mixture as the monomers were consumed in the polymerization reaction. After a period of three hours, during which a total of 860 g of the monomer mixture was used, the reactor was cooled to room temperature.

Excess monomer was vented and the reactor drained. A portion of the white latex (2.5 kg) was added slowly to a solution of 18 g of $MgCl_2.6H_2O$ in 800 g of water and 25 g of n-butyl alcohol. The white rubbery polymer which precipitated was washed several times with hot deionized water and dried overnight in a circulating air oven at 100°-120° C. $^{19}F$ NMR analysis of the polymer (in perdeutero acetone solution, $CFCl_3$ reference) showed resonances at −80.5 ppm ($CF_3$) and −120 to −126 ppm ($CF_2$), supporting the presence of a $C_8F_{17}$ end group in the polymer. Further analysis showed the presence of (in relative mole %) polymer units derived from 78.37% VF2, 20.98% HFP, and the following end groups: 0.10% $C_8F_{17}$, 0.46% $HCF_2$ and 0.09% $CH_3CF_2$. A FT IR spectrum of a thick film, revealed no absorptions between 1500 and 2000 $cm^{-1}$, while a comparative VF2/HFP copolymer (Cl above), prepared without the fluorochemical sulfinate, had absorption peaks at 1714 and 1753 $cm^{-1}$ indicating polar (carbonyl) end groups.

COMPARATIVE EXAMPLE CL

Comparative Example Cl is a copolymer of $VF_2$ and HFP (about 80/20 mole % ratio) prepared using conventional emulsion polymerization recipes as described in Ex. 1, without fluorochemical sulfinate.

EXAMPLE 2

The polymerization described in Example 1 was repeated with ½ of the quantity of initiators and with the addition of a fluorochemical emulsifier. Thus, 2.8L of deionized water, 12 g of $K_2HPO_4$, 2 g of $(NH_4)_2S_2O_8$ and 4.5 g of FS-1 ($C_8F_{17}SO_2Na$) and 0.6 g of $C_8F_{17}SO_2N(C_2H_5)CH_2COOK$ emulsifier were charged to the 4 L reactor. Following the same procedure as in Ex. 1, a total of 870 g of monomer mixture was polymerized. The polymerization took five hours and twenty minutes. Analytical data obtained on the resulting polymer supported the presence of $C_8F_{17}$ end groups.

EXAMPLE 3

The fluorochemical sulfinic acid, FS-3, $C_4F_9SO_2H$, was employed in this polymerization. It was first converted to the sodium salt, $C_4F_9SO_2Na$, by dissolving 5 g of the sulfinic acid in 100 mL deionized water and adding 0.7 g of NaOH followed by 2 g of $K_2HPO_4$. This solution was added to 2.8L of deionized water containing 10 g of $K_2HPO_4$, 4 g of $(NH_4)_2S_2O_8$ and 0.6 g of $C_8F_{17}SO_2N(C_2H_5)CH_2COOK$ emulsifier. The solution was added to the high pressure reactor and 1000 g of the same monomer blend used in Example 1 polymerized at a pressure of 0.79 MPa (115 psig) at 71° C. over a period of 4 hours. A portion of the resulting latex (2.0kg) was coagulated and the white, rubbery polymer product isolated, washed and dried as described in Ex 1. The Mooney viscosity of the rubber (ML 1+10@121° C.) was 71. $^{19}F$ NMR analysis showed resonances at −80.9, −123.9 and −125.5 ppm, supporting the presence of the $C_4F_9$ end group in the polymer chains.

EXAMPLE 4

Example 3 was repeated except that a different monomer mixture was used. 950 g of a monomer mixture from an 8L high pressure cylinder containing a mixture of 59.4 weight % $VF_2$, 40.3 % HFP and 0.40 % BDFE cure site monomer. The monomer blend was polymerized over a period of 6.5 hours at a pressure of 0.79 MPa (115 psig) at 71° C. A portion of the resulting latex was coagulated and the white polymer product was washed and dried as described in Example 1. The polymer had a Mooney Viscosity ((ML1+10 @121° C.) of 61. $^{19}F$ NMR analysis supported the presence of the C4F9 end groups in the polymer. The polymer contained 0.18 wt. % bromine as determined by X-ray fluorescence.

EXAMPLE 5

This Example describes the preparation of a fluoropolymer of $VF_2$, HFP and TFE using the sulfinate FS-1.

An 86-L high pressure reactor was charged with deionized water (45 kg), $K_2HPO_4$ (160.7 g), $C_8F_{17}SO_2Na$ (143.2 g), $(NH_4)_2S_2O_8$ (64 g) and $C_8F_{17}SO_2N(C_2H_5)CH_2COOK$ (9.6 g) emulsifier. After 4 consecutive vacuum and nitrogen purge cycles, the reactor was pressurized to 0.76 MPa (110 psig) at 71° C. with 384 g $VF_2$, 853 g HFP and 175 g of TFE. Agitation (130 rpm) was started and as soon as a pressure drop occurred, the 3 monomers were added at a rate to maintain constant pressure with the following monomer composition: 44.9 wt. % $VF_2$, 31.5% HFP and 23.6% TFE. After a total of 15.76 kg of monomers had reacted, the monomer supply was stopped and the reaction continued until the pressure decreased to 0.43 MPa (61 psig). At this point, the reactor and contents were cooled to room temperature and unreacted monomers vented. The reactor was then drained and the latex polymer product was coagulated and the white, rubbery polymer product washed and dried as described in Ex. 1. The polymer had a Mooney viscosity (ML 1+10 @121° C.) of 69 and a composition (by $^{19}F$ NMR analysis) of polymer units derived from 41.8 wt% $VF_2$, 32.8% HFP and 25.2% TFE, and with 0.23% $C_8F_{17}$ end groups.

EXAMPLE 6

This Example describes the preparation of a fluoropolymer of VF2 and HFP using a disulfinate as an initiator.

To a 4L stainless steel high pressure reactor was charged 2.8L deionized water, 12 g of $K_2HPO_4$ and 2 g of $(NH_4)_2S_2O_8$. The reactor was evacuated and the vacuum broken with nitrogen, and this cycle repeated 4 times. Then a solution of 4.2 g of the fluorochemical disulfinate FS-2, $(CF_2)_6(SO_2Na)_2$, in 100 mL water was charged together with a solution of 0.6 g of $C_8F_{17}SO_2N(C_2H_5)CH_2COOK$ emulsifier in 100 mL of water. The reactor was pressurized to 0.90 MPa (130 psig) at 71° C. with a monomer blend of 61.7 wt. % VF$_2$ and 38.3% HFP. The reactor contents were stirred (600 rpm) and the polymerization continued for 6 hours until a total of 360 g of monomers was polymerized. The resulting polymer latex was coagulated and the white, rubbery polymer product washed and dried as described in Ex. 1 A $^{19}$F NMR analysis showed resonances in the region −119 to −123 ppm (CFCl$_3$ standard) indicative of —CF$_2$(CF$_2$)$_x$CF$_2$—units in the polymer backbone, calculated to be a level of about 0.06 mole % of —(CF$_2$)$_6$—units based on total moles of interpolymerized units.

EXAMPLE 7

This Example describes the preparation of a fluoropolymer of VF$_2$ and HFP using another disulfinate as an initiator.

Example 6 was repeated except that in place of the FS-2 sulfinate, 4.9 g of FS-4 was used, after conversion to the sodium salt, NaO$_2$SC$_2$F$_4$N(CF$_2$CF$_2$)$_2$NC$_2$F$_4$SO$_2$Na, with aqueous sodium hydroxide. The reactor was pressurized to 0.90 MPa (130 psig) at 71° C. with a monomer blend of 61.7 wt. % VF$_2$ and 38.3% HFP. The reactor contents were stirred (600 rpm) and the polymerization continued for 4.5 hours until a total of 780 g of monomers was polymerized. The resulting polymer latex was coagulated and the white, rubbery polymer product washed and dried as described in Ex. 1. $^{19}$F NMR analysis (in perdeuterated DMF solvent) showed ressonances due to CF$_2$—N—CF$_2$— at −90.7 ppm supporting the presence of the —C$_2$F$_4$N(CF$_2$CF$_2$)$_2$NC$_2$F$_4$— unit in the polymer backbone.

EXAMPLE 8

This Example describes the preparation at room temperature of a fluoroplastic, polychlorotrifluoroethylene by the polymerization of chlorotrifluoroethylene (CTFE) in the presence of a fluorochemical sulfinate.

In a 4L high pressure reactor was placed 3.44 kg of deionized water, 22.6 g Na$_2$HPO$_4$, 19.3 g of C$_7$F$_{15}$COONH$_4$ emulsifier and 16.0 g of C$_8$F$_{17}$SO$_2$Na. After successive evacuations with a vacuum pump and pressurizing with nitrogen followed by a final evacuation, the reactor contents were stirred at 750 rpm and heated to 27° C. at a pressure of 0.0048 MPa (0.7 psig). Then 20.7 g of a 35 wt. % aqueous solution of (NH$_4$)$_2$S$_2$O$_8$ were added concurrently with 1,000 g of CTFE over 3 hours at 26° C. The reactor pressure increased from 0.0048 MPa (0.7 psig) to 0.72 MPa (104 psig) over this period. The reactor was held at a temperature of about 26° C. for 62 hours during which time the pressure fell to 0.12 MPa (17 psig). The reactor was cooled to room temperature and the product, a white emulsion, was drained and freeze-coagulated overnight to yield a flaky, white solid which was collected by aspirator suction on a linen cloth and washed 7 times with a 77 wt % water and 23 wt % methanol solution. $^{19}$F NMR analysis supported the presence of C$_8$F$_{17}$ end groups in the polymer.

EXAMPLE 9

This example describes the preparation of a fluoropolymer of VF2 and HFP at room temperature using a combination of perfluoroalkyl sulfinate (FS-1), C$_8$F$_{17}$SO$_2$Na, and potassium sulfite, K$_2$SO$_3$, as reducing agents.

To a 4-L high pressure reactor was 2.8 L deionized water, 12 g K$_2$HPO$_4$,9 g C$_8$F$_{17}$SO$_2$Na, 0.09 g CuSO$_4$.5 H$_2$O, 0.6 g of C$_8$F17SO$_2$N(C$_2$H$_5$)CH$_2$COOK emulsifier and 7.5 g of (NH$_4$)$_2$S$_2$O$_8$. The reactor was pressurized with a blend of 61.7 wt % VF2 and 38.3 wt % HFP to a pressure of 0.83 MPa (120 psig) at 15° C. Agitation (500 rpm) was commenced and a 5 wt % solution of K$_2$SO$_3$ was fed to the reactor. After 30 g of this solution had been added, a drop in pressure was noted indicating that polymerization was taking place. The monomer mixture was fed to the reactor at a rate to maintain the pressure at 0.83 MPa (120 psig), along with potassium sulfite solution at a rate of 20 g hr$^{-1}$. After 3.5 hours, a total of 1.02 kg of the monomer mixture had been consumed and a total of 70 g of potassium sulfite solution used. The excess monomer mixture was vented and the reactor drained and the resulting latex coagulated and the white, rubbery polymer product washed and dried as described in Ex. 1. The polymer had a Mooney viscosity (ML 1+10@121° C.) of 53 and a composition (by $^{19}$F NMR analysis) of polymer units derived from 61.2 wt % VF$_2$ and 38.3 wt % HFP and with 0.5 wt % C$_8$F$_{17}$ end groups.

This example demonstrates that a perfluorinated radical is formed even in the presence of a competing reducing agent such as potassium sulfite. Thus, the perfluorinated sulfinates of this invention can be used in combination with sulfites and other known reducing agents.

Curing of Fluoroelastomers

In the following Examples and Comparative Examples, polymers were cured and tested.

Three of the fluoropolymers of this invention (polymers of Examples 1, 4 and 5), containing perfluoroalkyl end groups, were cured. The cure rheology and cure properties are compared with analagous, Comparative Examples C2, C3 and C4, wherein the fluoropolymers used were prepared with the same monomers but in the absence of fluorochemical sulfinates. The cure compositions and cure rheology and other physical properties are shown in Tables 1 and 2 below.

EXAMPLE 10

The fluoroelastomer gum prepared in Example 5 was compounded with 30 phr MT black, 6 phr Ca(OH)$_2$, 3 phr MgO, and cured with 3.5 millimoles per 100 g of resin (mmhr) bisphenol AF, and 1.27 mmhr of phosphonium cure accelerator, [(C$_4$H$_9$)$_3$P$^+$CH$_2$CH$_3$][−OC$_6$H$_4$C(CF$_3$)$_2$—C$_6$H$_4$-OH] prepared from the reaction of tributyl (2-methoxypropyl) phosphonium chloride and the sodium salt of hexafluoroisopropylidene bis(4-hydroxybenzene).

COMPARATIVE EXAMPLE C2

A fluoroelastomer gum was prepared as in Example 5 except without C$_8$F$_{17}$SO$_2$Na. The resulting gum was cured and tested as in Example 10.

EXAMPLE 11

The fluoroelastomer gum of Example 4 was cured and tested as in Example 10 except with 3 phr of Ca-(OH)$_2$, 2.5 phr of triallylisocyanurate (TIAC), and 2.5 phr Luperco 101 XL organic peroxide from Atochem, and without MgO, bisphenol AF, and phosphonium cure accelerator.

COMPARATIVE EXAMPLE C3

A fluoroelastomer gum was prepared as in Example 4 except with 0.4 weight % BDFE and without $C_4F_9SO_2Na$. The resulting gum was cured and tested as in Example 11. The polymer contained 0.25 wt. % bromine as determined by X-ray fluorescence.

EXAMPLE 12

The fluoroelastomer gum of Example 1 was cured and tested as in Example 10.

COMPARATIVE EXAMPLE C4

A fluoroelastomer gum was prepared as in Example 1 except without $C_8F_{17}SO_2Na$. The resulting gum was cured and tested as in Example 10.

TABLE 1

| Example | C2 | 10 | C3 | 11 | C4 | 12 |
|---|---|---|---|---|---|---|
| Rheology Data Rheometer 177° C., 3° arc, 100 cpm | | | | | | |
| $M_L$, N.m | 1.13 | 1.80 | 2.03 | 1.24 | 1.24 | 1.70 |
| $t_s2$ (minutes) | 2 | 1.9 | 1.2 | 1.4 | 1.1 | 1.2 |
| $t_c'$ (50) (minutes) | 2.8 | 2.8 | 2.3 | 2.5 | 1.6 | 1.8 |
| $t_c'$ (90) (minutes) | 3.1 | 3.1 | 5.1 | 5.5 | 1.8 | 2.0 |
| $M_H$, N.m | 7.91 | 9.15 | 8.70 | 4.75 | 10.4 | 10.4 |
| ΔTorque ($M_H-M_L$) | 6.78 | 7.35 | 6.67 | 3.51 | 9.16 | 8.70 |

TABLE 2

| Cured Properties Press cure 10 min. @ 177° C. & post cure 16 hrs @ 230° C. | | | | | | |
|---|---|---|---|---|---|---|
| Tensile, MPa | 11.9 | 13.3 | 16.7 | 13.4 | 15.6 | 16.1 |
| Elongation, % | 270 | 285 | 241 | 336 | 197 | 213 |
| 100% modulus | 4.97 | 4.00 | 4.08 | 2.88 | 5.54 | 5.29 |
| Hardness (Shore A2) | 80 | 75 | 71 | 68 | 74 | 74 |
| Compression Set | | | | | | |
| O-rings, 70 hrs @ 200° C. | 39.5 | 24.3 | 34.6 | 48.1 | 21.0 | 20.7 |
| Heat-aged dumbbells (70 hrs @ 275° C.) | | | | | | |
| Tensile, MPa | 4.00 | 6.93 | | | | |
| Elongation, % | 445 | 370 | | | | |
| 100% modulus | 2.00 | 2.03 | | | | |
| Hardness (Shore A2) | 80 | 72 | | | | |

The data in Tables 1 and 2 show that the polymers of this invention are readily cured with either a bisphenol (Examples 10 and 11) or a peroxide (Example 11) cure system, giving good physical properties. In particular, Example 10 illustrates (compared with Comparative Example C2) that cured polymers of this invention have improved properties, e.g., compression set resistance, and better retention of physical properties after heat aging compared to fluoroelastomers prepared by conventional methods.

Various modification and alterations of this invention will be apparent to those skilled in the art without departing from the scope and spirit of this invention and this invention should not be restricted to that set forth herein for illustrative purposes.

What is claimed is:

1. A method for the preparation of fluorine-containing polymer comprising, polymerizing, under free-radical conditions, an aqueous emulsion or suspension of a polymerizable mixture comprising a fluoroaliphatic-radical containing sulfinate, and an oxidizing agent capable of oxidizing said sulfinate to a sulfonyl radical.

2. The method of claim 1 wherein said polymerizable mixture further comprises fluorine-containing ethylenically unsaturated monomer.

3. The method of claim 2 wherein said fluorine-containing monomer is selected from the group consisting of vinylidene fluoride, hexafluoropropene, chlorotrifluoroethylene, 1-chloropentafluoropropene, perfluoroalkyl vinyl ethers, tetrafluoroethylene, 1-hydropentafluoropropene, dichlorodifluoroethylene, 2-hydropentafluoropropene, vinyl fluoride, trifluoroethylene, 1,1-dichlorofluoroethylene, perfluorodiallylether, and perfluoro-1,3-dioxoles.

4. The method of claim 1 wherein said polymerizable mixture further comprises fluorine-free ehtylenically unsaturated monomer.

5. The method of claim 1 wherein said oxidizing agent is water-soluble.

6. The method of claim 1 wherein said oxidizing agent is selected from the group consisting of sodium, potassium, and ammonium persulfates.

7. The method of claim 1 wherein said sulfinate is $R_f(SO_2M_{1/x})_n$ where $R_f$ is fluoroaliphatic radical, M is a hydrogen atom or a cation of valence x, and n is 1 or 2.

* * * * *

UNITED STATES PATENT AND TRADEMARK OFFICE
CERTIFICATE OF CORRECTION

PATENT NO. : 5,285,002
DATED : February 8, 1994
INVENTOR(S) : Werner M. Grootaert It is certified that error appears in the above-identified patent and that said Letters Patent is hereby corrected as shown below:

On the Title Page, Item [57];
Abstract, line 5, delete "and".

Col. 4, line 15, Formula II, $R_f$ should read --$R_f'$--.

Col. 4, line 37, $R_f$ should read --$R_f'$--.

Col. 4, line 43, $R_f$ should read --$R_f'$;--.

Col. 4, line 56, $R_f'0$ should read --$R_f'$--.

Col. 8, line 52, eXtraction should read --extraction--.

Col. 12, line 51, the first bracketed portion of the formula should appear as follows:

$$[(C_4H_9)_3P^+CH_2CH(OCH_3)CH_3]$$

Signed and Sealed this

Twelfth Day of July, 1994

Attest:

BRUCE LEHMAN

*Attesting Officer*  *Commissioner of Patents and Trademarks*